US012291909B1

(12) United States Patent
Salvoni

(10) Patent No.: US 12,291,909 B1
(45) Date of Patent: May 6, 2025

(54) SYSTEM FOR FLUSH TRACK SLIDING DOOR

(71) Applicant: Bruno Salvoni, Doral, FL (US)

(72) Inventor: Bruno Salvoni, Doral, FL (US)

( * ) Notice: Subject to any disclaimer, the term of this patent is extended or adjusted under 35 U.S.C. 154(b) by 4 days.

(21) Appl. No.: 17/975,909

(22) Filed: Oct. 28, 2022

Related U.S. Application Data

(60) Provisional application No. 63/297,531, filed on Jan. 7, 2022.

(51) Int. Cl.
*E05D 15/06* (2006.01)
*E06B 3/46* (2006.01)

(52) U.S. Cl.
CPC ........ *E05D 15/0686* (2013.01); *E06B 3/4636* (2013.01); *E05Y 2900/132* (2013.01)

(58) Field of Classification Search
CPC ............ E05D 15/0686; E05D 15/0665; E05D 15/0656; E05D 15/0691; E06B 5/12; E06B 1/52; E06B 3/4636; E06B 7/14
See application file for complete search history.

(56) References Cited

U.S. PATENT DOCUMENTS 3,334,375 A * 8/1967 Eugene ................... E06B 3/924 16/97
3,896,589 A 7/1975 Mitchell
4,003,102 A 1/1977 Hawks
4,055,917 A * 11/1977 Coller ................... E06B 7/2309 49/469
4,351,131 A 9/1982 Kubik
4,443,984 A 4/1984 Rasmussen
D327,527 S 6/1992 Walker, Jr. et al.
5,465,537 A 11/1995 Fullwood
5,560,149 A 10/1996 Lafevre
5,596,851 A 1/1997 Ting
5,622,017 A * 4/1997 Lynn ................ B29C 66/72523 52/204.5
5,653,073 A 8/1997 Palmer
5,791,104 A 8/1998 Baier et al.
5,941,033 A 8/1999 Adams
6,055,782 A 5/2000 Morton et al.
(Continued)

*Primary Examiner* — Justin B Rephann
(74) *Attorney, Agent, or Firm* — MALLOY & MALLOY PL

(57) ABSTRACT

The present invention relates to a system for flush track sliding doors and/or windows, wherein an aboveground assembly is disposed in connection with a subsurface assembly through an interconnection mechanism, such that the surfaces bordering opposite ends of the system remain flush with the system itself, thereby retaining aesthetic continuity. Such a subsurface assembly may comprise at least one roller member disposed in moveable engagement with at least one track component, such that at least a portion of the subsurface assembly may be moved there along, wherein such movement may be imparted onto the aboveground assembly via the interconnection mechanism. Additional embodiments of the subsurface assembly may comprise a drainage assembly configured to receive fluid and/or debris, and subsequently expel the same therefrom. Such subsurface assembly and aboveground assembly may be divided by a removable cover assembly, which may be configured to approximate the abutting surfaces.

18 Claims, 4 Drawing Sheets

(56) References Cited

U.S. PATENT DOCUMENTS 6,098,343 A * 8/2000 Brown .................... E06B 1/702 49/471
6,158,182 A 12/2000 Biebuyck
6,182,405 B1 2/2001 Lindahl
6,487,753 B1 * 12/2002 Lonnberg ................ E06B 3/924 16/87.8
D486,919 S 2/2004 Legay et al.
6,715,248 B2 4/2004 Biebuyck
6,786,021 B1 9/2004 Chen
6,792,651 B2 * 9/2004 Weiland ................ E06B 3/4636 16/102
6,807,778 B2 10/2004 Engebretson
D508,741 S 6/2005 Mitrevics
D513,806 S 1/2006 Mitrevics
6,993,873 B2 2/2006 Biebuyck et al.
7,665,941 B2 2/2010 Wolf et al.
D612,517 S 3/2010 Nicholson
D612,951 S 3/2010 Piano
D621,073 S 8/2010 Bergmann
7,941,982 B2 5/2011 Merica
8,024,898 B2 * 9/2011 Alvarado .................. E06B 1/02 52/204.5
D665,516 S 8/2012 Bergmann
8,443,554 B1 * 5/2013 Teodorovich ........... E06B 1/705 52/204.5
8,584,410 B2 11/2013 Furgerson et al.
8,601,751 B2 * 12/2013 Carter ................. E05D 15/0686 52/169.5
8,640,339 B2 2/2014 Gilles et al.
8,833,035 B2 * 9/2014 Vos ........................... E06B 1/62 49/408
8,978,302 B2 * 3/2015 Ona Gonzalez ........ E05D 15/58 49/125
D757,300 S 5/2016 Haberland et al.
9,476,250 B2 10/2016 Danaud et al.
D772,429 S 11/2016 Bergmann
D809,160 S 1/2018 Zuellig
D811,618 S 2/2018 Zuellig
10,900,273 B1 1/2021 Salvoni
11,365,582 B1 6/2022 Salvoni
11,492,832 B2 * 11/2022 Hernandez ................ E06B 1/70
11,680,438 B2 * 6/2023 Fontijn ............... E05D 15/0686 52/217
12,012,799 B2 6/2024 Salvoni
2003/0226321 A1 12/2003 Engebretson
2004/0074174 A1 4/2004 Biebuyck et al.
2004/0244924 A1 12/2004 Peppett
2006/0059780 A1 3/2006 Petta et al.
2007/0151179 A1 7/2007 Speyer et al.
2007/0234657 A1 * 10/2007 Speyer ...................... E06B 7/23 52/207
2009/0100760 A1 * 4/2009 Ewing ....................... E05C 7/06 49/410
2012/0005975 A1 * 1/2012 Kim .......................... E06B 7/14 52/656.5
2012/0291392 A1 * 11/2012 Joray .................. E05D 15/0665 52/656.5
2013/0097934 A1 * 4/2013 Cook .................. E05D 15/0686 49/404
2014/0041326 A1 * 2/2014 Kadavy ..................... E06B 7/22 49/476.1
2014/0053488 A1 2/2014 Lenox et al.
2014/0182211 A1 * 7/2014 Lang ................... E05D 15/0665 49/420
2014/0202083 A1 * 7/2014 Joray .................. E05D 15/0691 49/425
2015/0233177 A1 8/2015 Marchand
2015/0240552 A1 * 8/2015 Kim .................... E05D 15/0665 49/411
2016/0201383 A1 7/2016 Lenox et al.
2016/0333630 A1 11/2016 Barton et al.
2016/0348418 A1 12/2016 Wexler
2016/0348423 A1 12/2016 Cruysberghs
2018/0038144 A1 2/2018 Metzger
2019/0003227 A1 * 1/2019 McCoy ................... E06B 1/702
2019/0169921 A1 * 6/2019 De Sousa Guedes ....................... E06B 3/4609
2019/0226257 A1 * 7/2019 Fontijn ............... E05D 15/0665
2019/0383078 A1 * 12/2019 Tsimbikos ................ E06B 3/46
2020/0408016 A1 * 12/2020 Hernandez .......... E05D 15/0686

* cited by examiner

SYSTEM FOR FLUSH TRACK SLIDING DOOR

BACKGROUND OF THE INVENTION

Claim of Priority

This Non-Provisional patent application claims priority to a previously filed and currently pending Provisional patent application, namely, that having 63/297,531 and a filing date of Jan. 7, 2022, which is incorporated herein by reference in its entirety.

Field of the Invention

The present invention is directed to a system for a flush track sliding door having a subsurface assembly and an aboveground assembly separated by a cover assembly and disposed in connection through an interconnection mechanism disposed therebetween, wherein such a subsurface assembly may additionally comprise a drainage assembly.

DESCRIPTION OF THE RELATED ART

In the realm of sliding doors, windows, and other like apparatuses, structural integrity is of utmost importance. Indeed, doors, windows, and the like provide both ingress and egress in relation to a user's dwelling, as well as security therefor. As such, door and window systems are typically heavy, in order to facilitate the above. Such weight of door and window systems is only exacerbated when installed in locations requiring impact resistance, such as from hurricanes and tornadoes. As a result, the weight of such door and window systems is typically regarded as non-negotiable.

As such, typical systems for doors and/or windows disposed on the bottom floor of a house or other dwelling are typically buried into the pavement, substrate, or other surface. Burying at least a portion of such a door and/or window system facilitates greater structural integrity, while likewise protecting at least some of the components, particularly those configured for movement, from outside influences such as rain, thereby protecting the same from unintended degradation and/or destruction. Moreover, the burying of at least a portion of such door and/or window systems yields certain aesthetic benefits, as the same may provide continuity between the flooring material extending from the interior of a dwelling to the exterior thereof. Alternatively put, the resulting appearance of an at least partially buried door and/or window system may appear flush with the pavement, substrate, floor, or surface within which it resides.

However, the foregoing configuration necessarily results in certain issues. For instance, as occurs in all mechanical systems, the stresses and strains associated with moving parts, such as sliding doors and windows, eventually leads to material degradation and component failure. The likelihood of failure of such systems as a whole is only increased in instances of poor installation, or where water or other extrinsic factors infiltrate the system. As may understood, the installation of sliding door and/or window systems in an at least partially buried orientation exacerbates instances of mechanical failure and/or material degradation.

Indeed, repair of sliding door and/or window systems is often costly and necessitates a highly specialized technician. In instances where at least a portion of the sliding door and/or window system is disposed beneath a substrate, the need to unearth the relevant components of the system prior to repair vastly increases both the time and expense required to fix the same. Even further, in instances wherein the substrate at issue is made of marble, wood, or some other finished flooring, replacing such flooring material adds even further time and expense to the repair job, especially during times where flooring material can be difficult to source due to delays in global logistics and other similar issues. And, notably, the continual removal and replacement of the sliding door and/or glass system, as well as the accompanying substrate, further degrades the substrate itself, often leading to water leakage, and thus perpetuating the foregoing costly negative feedback loop.

In view of the foregoing, there exists in the need in the field of sliding door and/or window systems which reduces or otherwise vitiates the complexities and issues relating to systems buried in a substrate. For instance, any such solution should be configured for easy repair of below-substrate placed components, while simultaneously preventing such components from damage due to water, fluid, and/or debris interactions. Alternatively put, such a solution should be configured to avoid the need to remove the substrate when repairing any components disposed there below. Likewise, any such solution should be configured for ease of installation, while retaining the desired flush appearance with the underlying substrate. Furthermore, any such solution should still retain the requisite structural rigidity for impact-resistant applications. And finally, such a system should be configured to expel any water and/or fluid which may infiltrate the components disposed below the substrate, thereby reducing the damage any such water and/or fluid may cause on such components.

SUMMARY OF THE INVENTION

In view of the foregoing, alternative embodiments of the present invention are generally directed to a system for a flush sliding door and/or window assembly (hereafter "flush assembly"), wherein such an assembly comprises an aboveground assembly and a subsurface assembly disposed in connection through an interconnecting mechanism disposed therebetween. Such an aboveground assembly may be disposed above a floor, substrate, or some other surface, whereas such a subsurface assembly may instead be disposed below such a floor, substrate, or other surface. Due to the interconnection between such aboveground assembly and such subsurface assembly via the interconnecting mechanism, it may be understood any movement imparted on one such assembly may thus be imparted on the other. As may be understood, such interaction between the aboveground assembly, the subsurface assembly, and the interconnecting mechanism may be applied to a variety of different sliding door and/or window assemblies, such as two-track systems, three-track systems, four-track systems, or any other such system whether now known or hereafter developed.

As previously stated, the aboveground assembly of at least one embodiment of the present invention may comprise a support assembly configured to support a panel, whether comprising a door, a piece of glass, or some other structure connected thereto. Accordingly, it may be understood such a support assembly may comprise various elements configured to secure the door and/or window of the flush system described herein.

For instance, in at least one embodiment, such a support assembly may comprise a clamping mechanism configured to securely fasten the support assembly to the panel connected thereto. For example, such a clamping mechanism may comprise two oppositely disposed structures each of which are configured to align with a notching component disposed on the panel. In at least one embodiment, such a clamping mechanism may further be disposed in connection with padding, dampening, or other similarly situated materials and/or components configured to reduce or otherwise vitiate damage occurring to the panel as a result of the engagement between the same and the support assembly. However, it may be understood such a clamping mechanism may instead comprise any other similarly functioning structure, whether now known or hereafter developed.

In at least one embodiment, such aboveground assembly may be disposed in connection with a subsurface assembly, the latter of which is configured to provide the sliding functionality of the flush assembly. As such, the subsurface assembly of at least one embodiment of the present invention may comprise a track assembly. Such a track assembly may comprise a track component or a plurality thereof, dependent upon the number of tracks and/or panels required of the flush assembly of the present invention. Further, such a track assembly may comprise at least one roller member, which may be configured in movable engagement with the track component, such that the track assembly, and by extension both the subsurface assembly and the aboveground assembly may be moved longitudinally along such track component. In at least one embodiment, such roller member(s) may comprise, for instance, stainless steel trolley wheels with high-capacity bearing, or any other similarly situated structure. As may be understood, each such roller member may comprise a single wheel or a plurality thereof.

Further, such a track assembly may additionally comprise a lodging cavity configured to house certain components, such as at least a portion of the track component. Such a lodging cavity may further be configured to receive debris and other unwanted materials that may fall into the track assembly and may thus itself comprise an expansion chamber configured to receive such debris and move the same away from the track component.

In at least one embodiment of the present invention, such a subsurface assembly May further comprise a drainage assembly configured to receive fluids and/or debris therein. Such drainage assembly may be disposed below the track assembly, and may comprise, for instance, a sill pan and/or a sill tray configured to receive fluid and/or debris therein. In at least one embodiment, such a drainage assembly may be sloped, or otherwise have an angle of inclination, such that any fluids and/or debris that fall therein are predisposed to travel in at least one direction. As such, the drainage assembly of at least one embodiment of the present invention may further comprise at least one drainage outlet, to which the angle of inclination is directed, such that the fluid disposed therein may ultimately exit the drainage assembly.

As previously stated, such subsurface assembly and such aboveground assembly may be disposed in connection via an interconnection mechanism disposed therebetween. Such interconnecting mechanism may comprise any structure configured to securably fasten the various components of the subsurface assembly and such aboveground assembly to each other, such that any movement imparted on one such assembly is likewise imparted on the other. For instance, such an interconnection mechanism may comprise two attachment ends, namely, an aboveground attachment end and a subsurface attachment end. Such aboveground attachment end may be disposed in connection with the aboveground assembly, such as through the support assembly. In contrast, the subsurface attachment end may be disposed in connection with the subsurface assembly, such as through the track assembly.

Such an interconnection mechanism may further be disposed in connection with a cover assembly. For instance, such a cover assembly may be configured so as to provide two principal functions: (1) protect the subsurface assembly from the infiltration of water, fluids, and/or debris therein; and (2) provide easy access to such subsurface assembly in the event repairs, maintenance, cleaning, or access is needed thereto. Accordingly, in at least one embodiment of the present invention, such a cover assembly may comprise a removable lid, a hinged lid, or some other similarly situated structure, which may be disposed to be level with the surface, or otherwise disposed slightly thereunder. Such a cover assembly may, in at least one embodiment, be configured to match, approximate, or otherwise resemble the surface upon which it is disposed.

For instance, such a cover assembly may comprise individual planks of material, and may be formed of, for instance, marble, wood, or any other flooring finish, such that the same may be coextensive in appearance with the flooring material of the interior and/or exterior of a dwelling. Each such plank may be individually removable from the subsurface assembly and/or the aboveground assembly, thereby facilitating easy access and repair at discrete locations.

As may be understood, the interrelation between the cover assembly and the interconnection mechanism may require precise dimensioning, such that the interconnection mechanism may freely impart movement between the track assembly and the panels, while likewise minimizing the gaps and/or openings available for the infiltration of fluid and/or debris into the subsurface assembly. As such, the cover assembly of at least one embodiment of the present invention may comprise at least one cover opening, wherein such at least one cover opening may be cooperatively sized with the interconnection mechanism. As may be understood, the cover assembly of at least one embodiment may comprise one such cover opening per each such interconnection mechanism—i.e., there may be an equivalent number of openings per tracks of the flush assembly of the present invention. As used herein, the term "cooperatively sized" refers to the minimum amount of clearance required for the interconnection mechanism to impart movement between the track assembly and the panels, as may be understood by one having skill in the art.

In at least one embodiment, such at least one opening of the cover assembly may comprise a dividing structure, which may be configured to provide a some physical structure within the space between the cover opening(s) of the cover assembly and the interconnection mechanism. For instance, such a dividing structure may be disposed on each side of the cover opening, and thus on each side of the interconnection mechanism. Such a dividing structure in at least one embodiment may be configured in touching engagement with the interconnection mechanism, such that the dividing structure abuts, and indeed touches upon the interconnection mechanism. However, such a dividing structure may be configured so as not to prevent movement of the interconnection mechanism, or otherwise provide frictional forces sufficient to deter and/or interfere with the interconnection mechanism of its intended function. As such, the dividing structure may comprise, for instance, a bristle assembly, or some other similarly situated structure intended to touch, but not deter, the interconnection mechanism, while simultaneously preventing debris from infiltrating the subsurface assembly.

These and other objects, features, and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE INVENTION IN VARIOUS EMBODIMENTS

Figure 1:
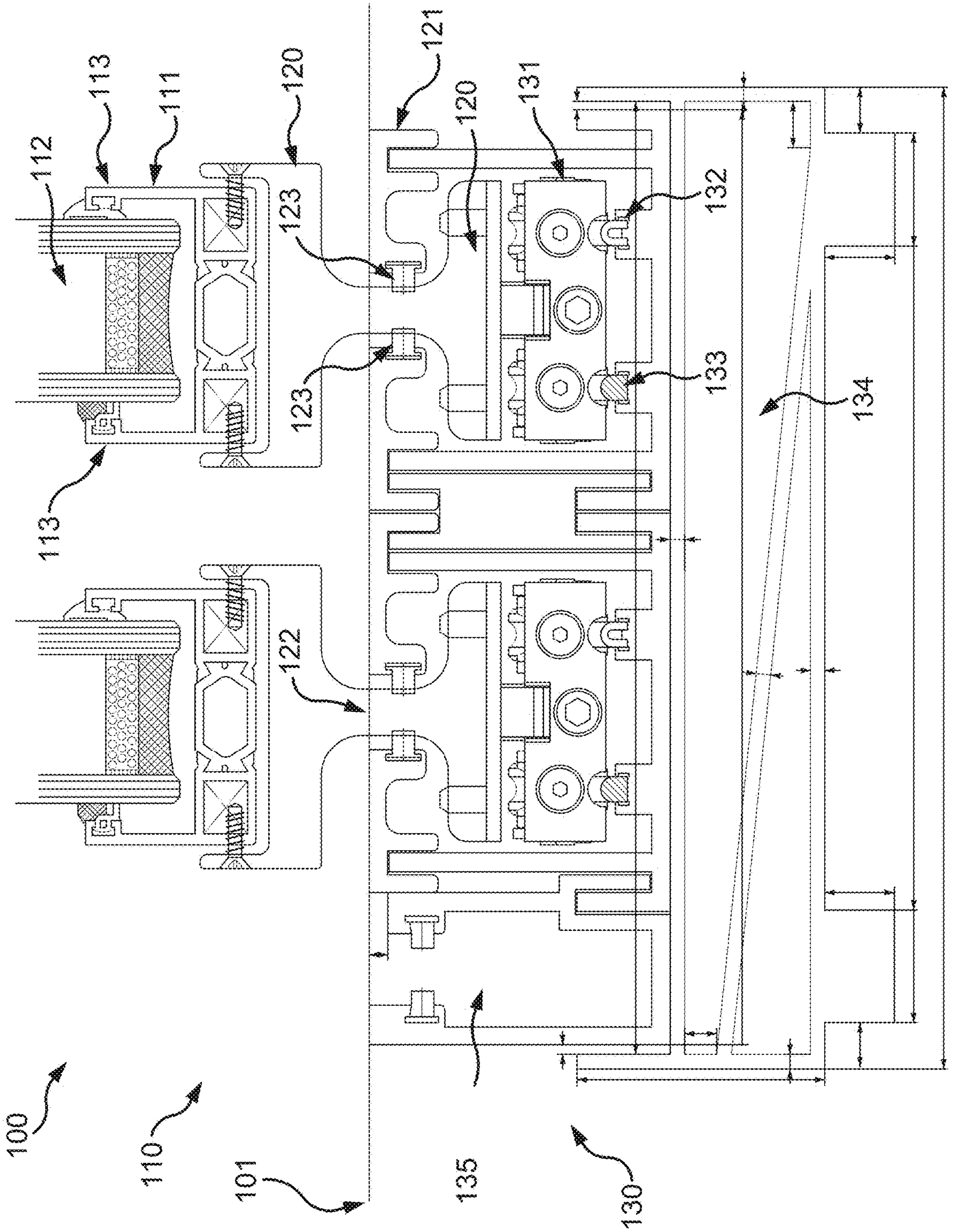
FIG. 1 depicts a cross-sectional side view of a two-track flush assembly, in accordance with at least one embodiment of the present invention.

As discussed heretofore, alternative embodiments of the present invention are directed to systems for a flush assembly 100—i.e., a system for a flush sliding door and/or window assembly, wherein such an assembly is disposed at least partially below a surface, substrate, floor, or other similar structure. Various embodiments of such a flush assembly 100 may comprise, for instance, an aboveground assembly 110 and a subsurface assembly 130, which may be disposed in connection through an interconnection mechanism 120 disposed therebetween. As may be understood, such an aboveground assembly 110 may be disposed above a surface 101, such a floor, whereas the subsurface assembly 130 may be disposed below such a surface 101. Various embodiments of such a flush assembly may comprise singular track, two-track, or three-track systems, or any other such system whether now known or hereafter developed. As such, it may be understood that the various components of the flush assembly 100 may reside in multiples dependent on the number of tracks utilized therein. In other words, while each component may be discussed in the singular herein, it may be understood the flush assembly 100 of the present invention may comprise multiple such components to account for each track thereof.

Figure 2:
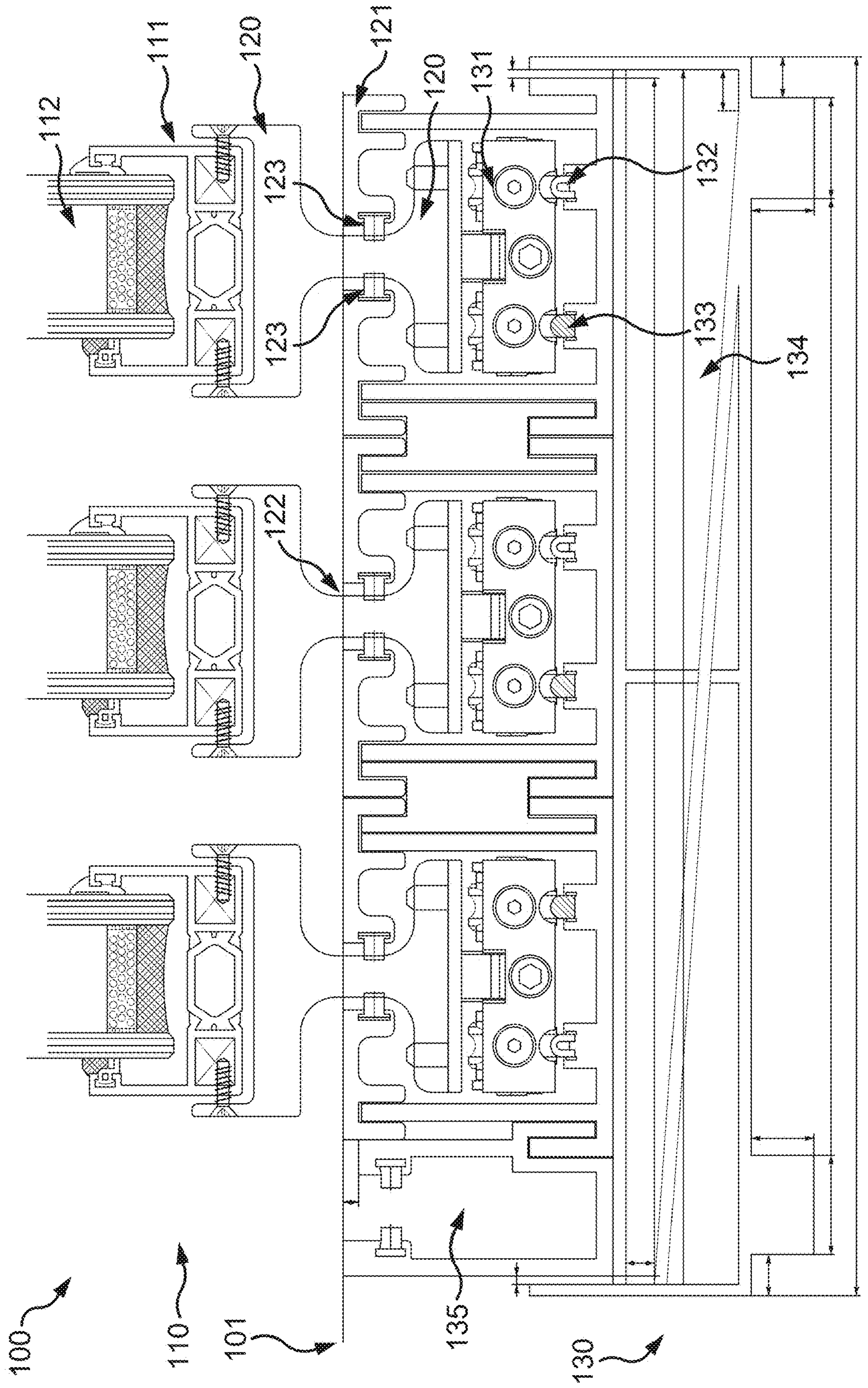
FIG. 2 depicts a cross-sectional side view of a three-track flush assembly, in accordance with at least one embodiment of the present invention.
Figure 3:
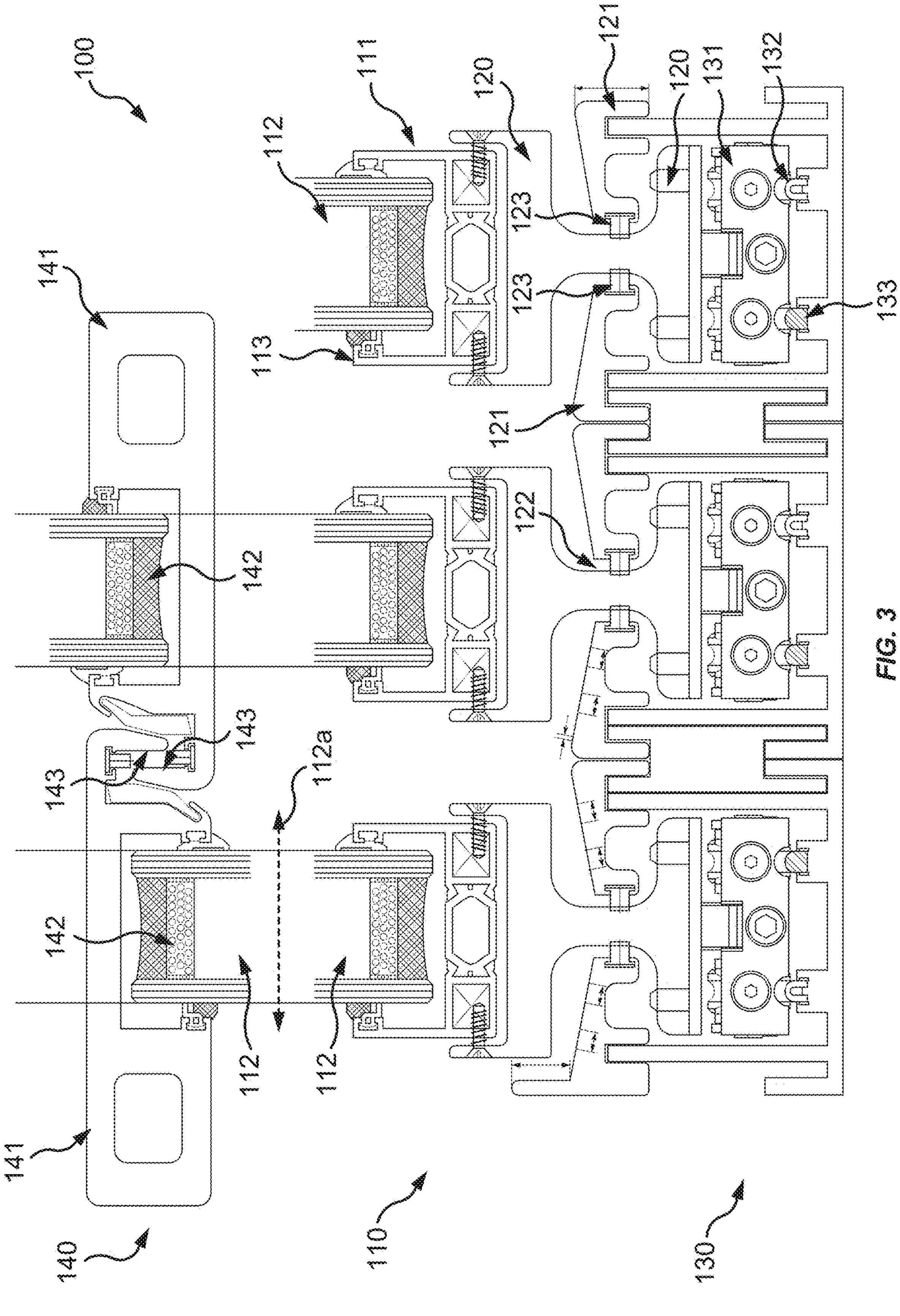
FIG. 3 depicts a cross-sectional side view of three-track flush assembly having a header assembly connected to the panels thereof, in accordance with at least one embodiment of the present invention.

For instance, the embodiments depicted in FIGS. 1-3 comprises a two-track embodiment, as depicted in FIG. 1, or a three-track embodiment, as depicted in FIGS. 2-3, of the flush assembly 100 of the present invention. As may be seen therein, the aboveground assembly 110 and the subsurface assembly are divided by the surface 101 which, as previously stated, may be a floor or some other substrate. Such an aboveground assembly 110 may comprise a support assembly 111, which may be configured to house, or hold, a panel 112. Such a panel 112 may comprise, for instance, a door or window, whether glass or otherwise, or some other similar structure. As shown in the embodiment depicted in FIGS. 1-3, such a panel 112 may be securably affixed to the support assembly 111 via oppositely disposed clamping mechanisms 113. Such clamping mechanism(s) 113 may be configured to align with a notching component disposed on the panel 112, and may further comprise padding structures, such as padding and/or dampening materials and/or components configured to reduce and/or vitiate damage occurring to the panel 112 as a result of the interaction between the panel 112 and the clamping mechanisms 113. As depicted in FIG. 3, the panel(s) 112 may comprise a line-of-sight 112*a* in at least some embodiments.

With continued reference to FIGS. 1-3, disposed below the surface 101 may be the subsurface assembly 130. Such a subsurface assembly 130 may comprise, for instance, a track assembly 131. Such a track assembly 131 may be configured to provide the sliding functionality of the flush assembly 100 and, as previously stated, may comprise two, three, or more tracks with which the remaining components of the flush assembly 100 may interact. Such a subsurface assembly 130 may additionally comprise a sill extension 135, such as in the embodiments depicted in FIGS. 1-2.

In at least one embodiment, such a track assembly 131 may comprise individual track components which may be configured for movable engagement with at least one roller member 133. Accordingly, such roller member(s) 133 may be configured to move any structures attached thereto along the track components. Alternatively put, the moveable engagement between the roller member(s) 133 and the track components may enable the subsurface assembly 130 and the aboveground assembly 110 to move longitudinally along the track component(s). In at least one embodiment, such a roller member 133 may comprise stainless steel trolley wheels having a high-capacity bearing, whether one or a plurality thereof. Alternative embodiments of the flush assembly 100 described herein contemplate alternative structures for such roller member 133, provided such structures enable the moveable engagement recited herein, while likewise having sufficient structural integrity to bear the weight of the flush assembly 100 recited herein.

With continued reference to FIGS. 1-3, such a subsurface assembly 130 may additionally comprise a lodging cavity 132. Such a lodging cavity 132 may be structured to house certain elements, such as at least a portion of the track component. Further, because it is possible that debris and other unwanted materials may fall within the track component, such a lodging cavity 132 may further be structured to facilitate the receipt of such debris without affecting the movement of the track assembly 131, and by extension, the flush assembly 100 as a whole. As such, the lodging cavity 132 of at least one embodiment of the present invention may comprise an expansion chamber which may be configured to receive such debris, thereby moving the same away from the roller member(s) 133 of the track assembly 131.

Referring now to FIGS. 1 and 2, at least some embodiments of the flush assembly 100 of the present invention may further include a subsurface assembly 130 comprising a drainage assembly 134. Such a drainage assembly 134 may be configured to receive fluids and/or debris therein, such as through drainage ports disposed within the subsurface assembly 130, such as along the track components and/or within the lodging cavity 132. For instance, such a drainage assembly 134 may comprise a sill pan and/or a sill tray. In at least one embodiment, such a drainage assembly may be sloped, or otherwise comprise an angle of inclination, such that fluid and/or debris may be predisposed to travel in at least one direction, such as to a drainage outlet disposed at some location along the subsurface assembly 130. In so doing, it may be understood such a drainage assembly 134 may be configured to receive and expel at least fluids, if not debris as well, from the subsurface assembly 130.

Returning to FIGS. 1-3, it may be the aboveground assembly 110 and the subsurface assembly 130 of various embodiments of the present invention may be disposed in connection through an interconnection mechanism 120 disposed therebetween. Such an interconnection mechanism 120 may comprise, for instance, any structure configured to securable fasten the various components of the subsurface assembly 130 and the aboveground assembly 110 to each other such that any movement provided by the subsurface assembly 130 may be imparted onto the aboveground assembly 110. For instance, such an interconnection mechanism 120 may comprise two oppositely disposed attachment ends, namely, an aboveground attachment end and a subsurface attachment end. Such an aboveground attachment end may be disposed in connection with, for instance, the support assembly 111, whereas the subsurface attachment end may be disposed in connection with the track assembly 131. As may be understood, such an interconnection mechanism 120 may be selectively configured, at least in terms of dimensions and material selection, in accordance with the intended application of the flush assembly 100. Alternatively put, dependent upon the weight required to be moved in the flush assembly 100, which may depend on, for instance, the panel(s) 112 utilized in such flush assembly 112, such an interconnection mechanism 120 may take on various materials, sizes, and/or structures.

With continued reference to FIGS. 1-3, such an interconnection mechanism 120 may be disposed in connection with the aboveground assembly 110 and the subsurface assembly 130 through a cover assembly 121, which may be configured to divide each such assembly. Accordingly, such a cover assembly 121 may be configured to protect the subsurface assembly 130 from the infiltration of fluids and/or debris, while simultaneously providing easy access to the same, thereby facilitating easy repairs, maintenance, and/or cleaning thereof. In at least one embodiment, such a cover assembly 121 may comprise a removable lid, a hinged lid, or some other similar structure. Such a cover assembly 121 may be configured to be level with the surface, or at some varying height in relation thereto. In at least one embodiment of the present invention, such a cover assembly 121 may be configured in removable engagement with the subsurface assembly and/or the aboveground assembly 110.

In at least one embodiment, such a cover assembly 121 may instead comprise a plurality of individual planks of material, which may be substantially rectangular in shape, or may instead comprise some other shape. Such planks of material may be configured to match, approximate, or otherwise resemble the surface(s) residing next to the flush assembly 100 recited herein. For instance, such planks of material may be formed of marble, wood, or any other flooring finish. It should be understood that the cover assembly 121 of varying embodiments of the present invention may similarly be formed of the aforementioned materials with the intent of resembling the surface at hand. Each of such plank of material may be individually disposed in removable engagement with the subsurface assembly 130 and/or the aboveground assembly 110.

As may be understood, such a cover assembly 121 of varying embodiments of the present invention may be configured to provide the interconnection mechanism 120 between the aboveground assembly 110 and the subsurface assembly 130 through at least one cover opening 122, through which the interconnection mechanism 120 may be disposed. Accordingly, through such a cover opening 122, such an interconnection mechanism 120 may freely impart the movement from the subsurface assembly 130 to the aboveground assembly 110. In at least one embodiment of the present invention, such a cover opening 122 may be cooperatively sized, such that the same enables the functionality of the interconnection mechanism 120 recited heretofore, while similarly reducing the gaps through which fluid and/or debris may infiltrate the subsurface assembly 130.

In certain embodiments of the present invention, such as those depicted in FIGS. 1-3, such a cover opening 122 may comprise a dividing structure 122, such as a plurality of bristles. Such a dividing structure 122 may be configured to fill in the space between the physical structures of the cover assembly 121 and the interconnection mechanism 120, thereby serving to further prevent the infiltration of debris and/or fluid into the subsurface assembly 130. Accordingly, such a dividing structure 122 may be configured in touching engagement with the interconnection mechanism 122, such as on each side thereof, such that the dividing structure 122 touches the interconnection mechanism 120 without preventing or reducing the movement thereof.

Figure 4:
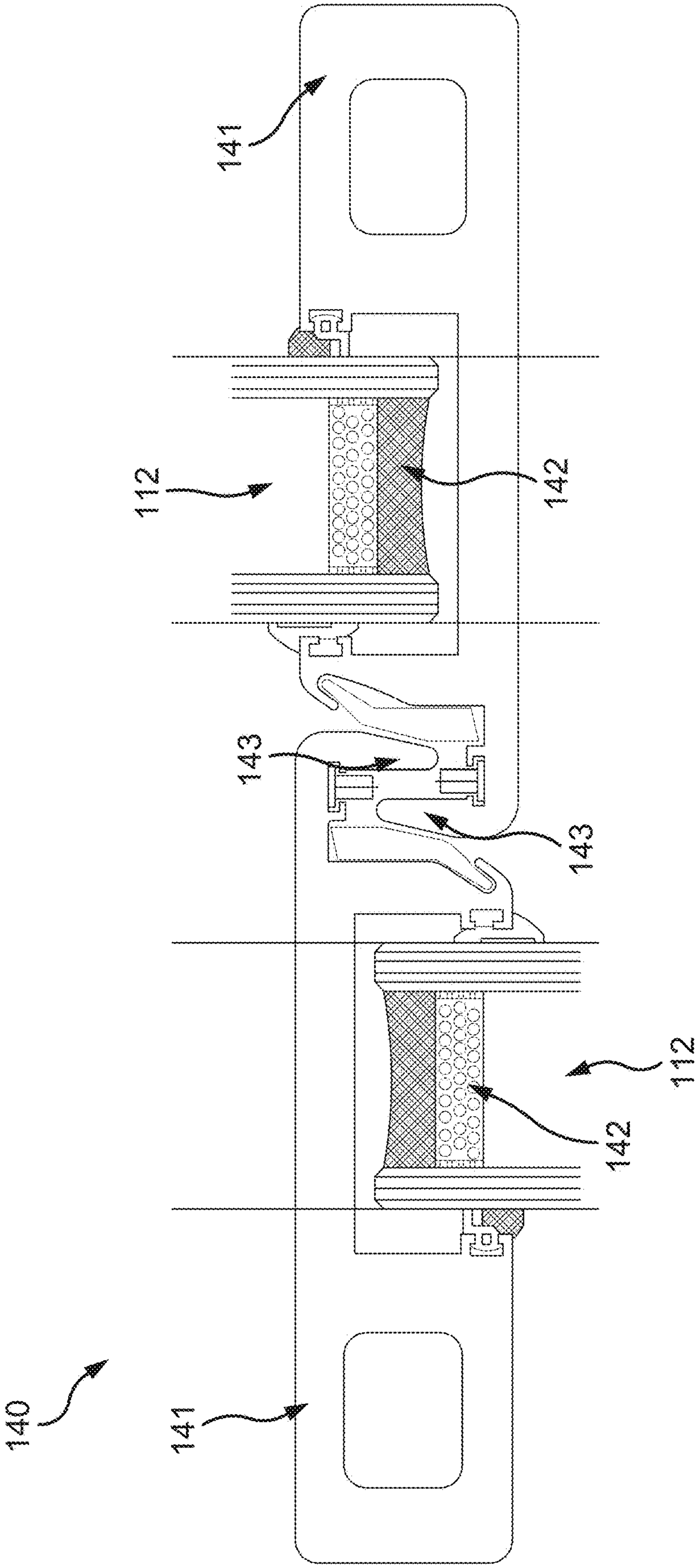
FIG. 4 depicts a cross-sectional side view of a header assembly, to be used in connection with the flush assembly of at least one embodiment of the present invention.

With reference now to FIGS. 3-4, certain embodiments of the aboveground assembly 110 of the present invention may comprise a header assembly 140 disposed in connection with the top portion of the panel(s) 112, and configured to connect, and disconnect, each panel 112 into and out of secured engagement with an adjacent panel 112. Such a header assembly 140 may comprise, for instance, a support structure 141 which may be attached to the panel 112 through connection members. Such a header assembly 140 may further comprise at least one interlocking member 143 configured for engagement with the interlocking member 143 of an adjacently disposed header assembly 140. In at least one embodiment, such interlocking members 143 of adjacently disposed header assemblies 140 may comprise a thermal break, such that noise and/or heat are dampened at such structures, thereby reducing the conduction thereof through the flush assembly 100 recited herein.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A flush assembly comprising:

an aboveground assembly disposed above a surface;

a subsurface assembly disposed below the surface;

said aboveground assembly and said subsurface assembly divided by a cover assembly, and disposed in connection through at least one interconnection mechanism disposed therebetween;

said aboveground assembly comprising at least one panel, wherein said at least one panel of said aboveground assembly is securably affixed at its top end to at least one header assembly;

said at least one header assembly comprising at least one interlocking member configured for engagement with an interlocking member of an adjacently disposed header assembly;

said interlocking members of adjacently disposed header assemblies comprising a thermal break;

said subsurface assembly comprising at least one track assembly, said at least one track assembly comprising at least one roller member disposed in moveable engagement with at least one track component, such that at least a portion of said subsurface assembly is configured to move along said at least one track assembly; and said cover assembly comprising at least one panel configured in removable engagement with said subsurface assembly.

2. The flush assembly of claim 1, wherein said cover assembly comprises at least one cover opening.

3. The flush assembly of claim 2, wherein said at least one cover opening is cooperatively sized in relation to said at least one interconnection mechanism.

4. The flush assembly of claim 2, wherein said at least one cover opening comprises at least one dividing structure disposed in touching engagement with said at least one interconnection mechanism.

5. The flush assembly of claim 1, wherein said subsurface assembly comprises at least one drainage assembly.

6. The flush assembly of claim 5, wherein said at least one drainage assembly comprises a sill pan.

7. The flush assembly of claim 6, wherein said at least one drainage assembly comprises an angle of inclination.

8. A flush assembly comprising:

an aboveground assembly disposed above a surface;

a subsurface assembly disposed below the surface;

said aboveground assembly and said subsurface assembly disposed in connection through at least one interconnection mechanism disposed therebetween;

said aboveground assembly comprising at least one panel, wherein said at least one panel of said aboveground assembly is securably affixed at its top end to at least one header assembly;

said at least one header assembly comprising at least one interlocking member configured for engagement with an interlocking member of an adjacently disposed header assembly;

said interlocking members of adjacently disposed header assemblies comprising a thermal break;

said subsurface assembly comprising at least one track assembly, said at least one track assembly comprising at least one roller member disposed in moveable engagement with at least one track component, such that at least a portion of said subsurface assembly is configured to move along said at least one track assembly; and said subsurface assembly further comprising at least one drainage assembly.

9. The flush assembly of claim 8, wherein said at least one drainage assembly comprises a sill pan.

10. The flush assembly of claim 8, wherein said at least one drainage assembly comprises at least one angle of inclination, said at least one angle of inclination directed towards at least one drainage outlet.

11. The flush assembly of claim 8, wherein said aboveground assembly and said subsurface assembly are divided by at least one cover assembly.

12. The flush assembly of claim 11, wherein said at least one cover assembly comprises a plurality of panels.

13. The flush assembly of claim 11, wherein said at least one cover assembly comprises at least one cover opening cooperatively sized in relation to said at least one interconnection mechanism.

14. The flush assembly of claim 11, wherein said cover assembly is configured in removable engagement with said subsurface assembly.

15. A flush assembly comprising:

an aboveground assembly disposed above a surface;

a subsurface assembly disposed below the surface;

said aboveground assembly and said subsurface assembly divided by a cover assembly, and disposed in connection through at least one interconnection mechanism disposed therebetween;

said aboveground assembly comprising at least one panel, wherein said at least one panel of said aboveground assembly is securably affixed at its top end to at least one header assembly;

said at least one header assembly comprising at least one interlocking member configured for engagement with an interlocking member of an adjacently disposed header assembly;

said interlocking members of adjacently disposed header assemblies comprising a thermal break;

said subsurface assembly comprising at least one track assembly, said at least one track assembly comprising at least one roller member disposed in moveable engagement with at least one track component, such that at least a portion of said subsurface assembly is configured to move along said at least one track assembly;

said cover assembly comprising at least one panel configured in removable engagement with said subsurface assembly;

said cover assembly further comprising at least one cover opening cooperatively sized in relation to said at least one interconnection mechanism; and said subsurface assembly further comprising at least one drainage assembly configured to receive fluid therein.

16. The flush assembly of claim 15, wherein said at least one cover opening comprises at least one dividing structure.

17. The flush assembly of claim 15, wherein said at least one drainage assembly comprises an angle of inclination configured to direct the fluid towards at least one drainage outlet.

18. The flush assembly of claim 15, wherein said at least one panel of said aboveground assembly is securably affixed at its bottom end to at least one support assembly.

* * * * *